US010392923B2

(12) United States Patent
Delgado

(10) Patent No.: US 10,392,923 B2
(45) Date of Patent: Aug. 27, 2019

(54) SYSTEM AND METHODOLOGY FOR DETERMINING FORCES ACTING ON COMPONENTS

(71) Applicant: Schlumberger Technology Corporation, Sugar Land, TX (US)

(72) Inventor: Miguel Marcel Jose Delgado, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 305 days.

(21) Appl. No.: 15/109,916

(22) PCT Filed: Jan. 6, 2015

(86) PCT No.: PCT/US2015/010207
§ 371 (c)(1),
(2) Date: Jul. 6, 2016

(87) PCT Pub. No.: WO2015/103571
PCT Pub. Date: Jul. 9, 2015

(65) Prior Publication Data
US 2016/0333683 A1 Nov. 17, 2016

Related U.S. Application Data

(60) Provisional application No. 61/924,120, filed on Jan. 6, 2014.

(51) Int. Cl.
*E21B 47/06* (2012.01)
*G01L 9/00* (2006.01)
(Continued)

(52) U.S. Cl.
CPC .......... *E21B 47/06* (2013.01); *E21B 47/0006* (2013.01); *G01L 1/02* (2013.01); *G01L 5/161* (2013.01); *G01L 9/00* (2013.01)

(58) Field of Classification Search
CPC ....... E21B 47/06; E21B 47/0006; G01L 9/00; G01L 5/161; G01L 1/02
See application file for complete search history.

(56) References Cited

U.S. PATENT DOCUMENTS 4,793,410 A 12/1988 Sipos et al.
4,805,449 A * 2/1989 Das .................. E21B 21/08
175/48

(Continued)

OTHER PUBLICATIONS

International Search Report and Written Opinion issued in related PCT application PCT/US2015/010207 dated Mar. 19, 2015, 14 pages.

(Continued)

*Primary Examiner* — Michael R Wills, III

(57) ABSTRACT

A technique facilitates measurement of forces resulting from a variety of loads, stresses, temperatures, or other sources. In an embodiment, the system comprises a load cell constructed with channels extending into a component which may be subjected to forces. Sensors cooperate with the channels to detect changes in volume of the channels as an indicator of the forces acting on the component. In some applications, the channels enclose a liquid, and the sensors comprise pressure sensors which detect changes in pressure within the liquid due to the volumetric changes in the channels. The system also may comprise a compensation system which compensates for external influences, such as temperatures and hydrostatic pressures.

19 Claims, 2 Drawing Sheets

(51) Int. Cl.
*G01L 1/02* (2006.01)
*E21B 47/00* (2012.01)
*G01L 5/16* (2006.01)

(56) References Cited

U.S. PATENT DOCUMENTS

| | | | |
|---|---|---|---|
| 5,065,129 | A | 11/1991 | Hellwig et al. |
| 5,386,724 | A | 2/1995 | Das et al. |
| 5,983,731 | A * | 11/1999 | Sommerfeld ......... G01L 1/2231 73/862 |
| 6,216,533 | B1 | 4/2001 | Woloson et al. |
| 8,739,868 | B2 | 6/2014 | Zeineddine |
| 8,783,382 | B2 | 7/2014 | Ignova et al. |
| 9,038,452 | B2 * | 5/2015 | Lee ....................... G01L 5/0004 73/152.48 |
| 9,222,308 | B2 | 12/2015 | Zeineddine et al. |
| 9,416,648 | B2 * | 8/2016 | Kenison ................. E21B 47/00 |
| 2006/0103192 | A1 * | 5/2006 | Norton ................... B60N 2/002 297/217.2 |
| 2009/0071645 | A1 | 3/2009 | Kenison et al. |

OTHER PUBLICATIONS

International Preliminary Report on Patentability issued in related PCT application PCT/US2015/010207 dated Jul. 21, 2016, 11 pages.

\* cited by examiner

SYSTEM AND METHODOLOGY FOR DETERMINING FORCES ACTING ON COMPONENTS

CROSS-REFERENCE TO RELATED APPLICATIONS

The present document is based on and claims priority to U.S. Provisional Application Ser. No. 61/924,120 filed Jan. 6, 2014, which is incorporated herein by reference in its entirety.

BACKGROUND

Downhole well strings often support high loading and stresses during a variety of downhole operations. For example, drill strings may incur high forces resulting from weight on bit loads and torques experienced by the drill string during drilling operations. Measurement devices may be used to measure these force loads in an effort to optimize the drilling performance. However, the force, e.g. stress, parameters can be difficult to evaluate from the surface, and the downhole force measurement equipment tends to lack reliability and durability. Additionally, the measurement devices often are subjected to the high pressures and high temperatures that can occur in a drilling environment.

SUMMARY

In general, a system and methodology are provided for measuring forces resulting from, for example, a variety of loads, stresses and temperatures. The system and methodology may be utilized in systems and components subjected to forces, e.g. downhole well systems such as drill strings and various downhole measuring tools. In an embodiment, the system comprises a load cell mounted on or otherwise integrated with a component. The load cell utilizes channels which are subjected to forces experienced by the component. Sensors cooperate with the channels to detect changes in volume of the channels as an indicator of the forces acting on the component. In some applications, the channels enclose a liquid, and the sensors comprise pressure sensors which detect changes in pressure within the liquid due to the volumetric changes in the channels. The system also may comprise a compensation system which compensates for external influences, such as temperatures and hydrostatic pressures.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
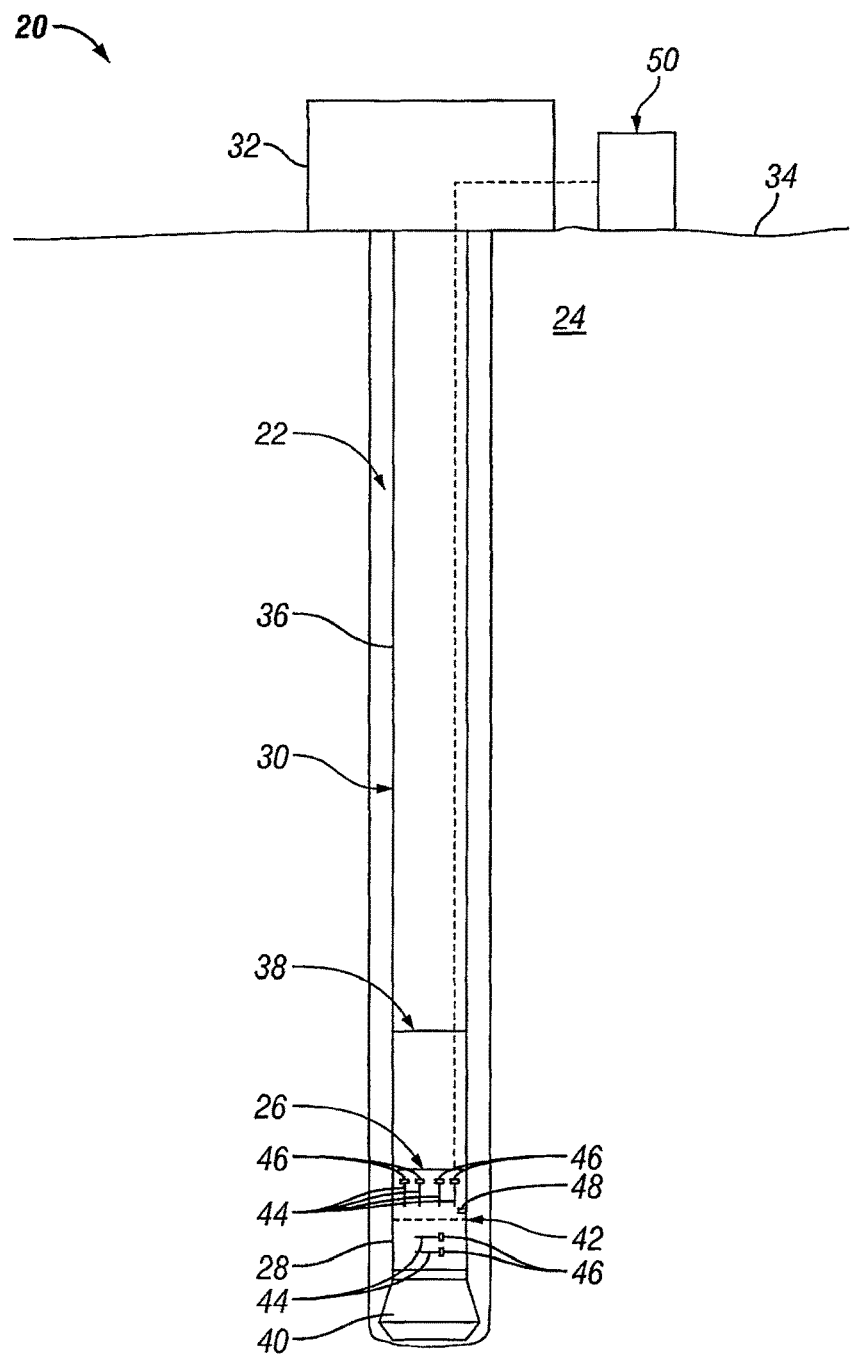
FIG. 1 is a schematic illustration of an example of a well system deployed in a wellbore and including a force detecting system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology related to measuring forces resulting from a variety of loads, stresses, temperature changes, and/or other sources. The technique may be applied in many types of systems and components subjected to forces, including downhole well systems. For example, the technique may be used to detect and monitor forces in a drill string subjected to a variety of forces during drilling operations. The system also may be combined with a number of downhole measuring tools or other well related components.

In an example, the system comprises a load cell constructed with channels, e.g. capillaries, extending into a portion of the load cell (and/or into another component affixed to the load cell) subjected to forces. Sensors cooperate with the channels to detect changes in volume of the channels as an indicator of the forces acting on the component. In some applications, the channels enclose a liquid, and the sensors comprise pressure sensors which detect changes in pressure within the liquid due to the volumetric changes in the channels. The data from the pressure sensors is sent to a processing system, such as a computer-based microprocessor, which converts the pressure data to desired information regarding forces acting on the component. The system also may comprise a compensation system which compensates for external influences, e.g. environmental influences, such as temperatures and hydrostatic pressures which can affect the sensors and/or component.

By way of example, the system may comprise a load cell mounted to a component, such as a sub forming part of a downhole well string. The load cell may be mounted to the component, e.g. affixed to the component, in a manner such that stresses and strains acting on the component are also experienced by the load cell. The load cell utilizes hydraulic channels, e.g. capillaries, filled with liquid and arranged in a specific pattern. The pattern is selected to enable conversion of component deformation, due to stress applied to the component, into pressure variations which may be measured by a sensor or sensors. The pressure data resulting from the pressure variations is then converted into stress values or measurements which may be used in adjusting, e.g. optimizing, operation of the downhole well string. In other words, the load cell is constructed to use isotropic volume deformation of material under stress. Consequently, stress determination may be achieved with a simpler, more durable, and more reliable system which does not rely completely on surface deformation as with conventional strain gauges. The system also may comprise a compensation system which may be used for calibration, e.g. self-calibration, of the load cell.

Referring generally to FIG. 1, an embodiment of a well system 20 is illustrated as deployed in a wellbore 22, e.g. a cased or open wellbore. The well system 20 may comprise a variety of other and/or additional components depending on the parameters of a given application. However, the illustrated well system 20 provides an example of a drilling system which may be employed to drill wellbore 22 into a desired subterranean formation 24.

In the example illustrated, well system 20 comprises a force determining system 26, e.g. a force measurement and monitoring system, coupled into a component 28 of a well string 30, e.g. a drill string. It should be noted, however, that force determining system 26 may be utilized in many other types of downhole applications, other types of well strings, and in non-well related applications to determine, e.g. monitor, forces acting on the component 28 and/or surrounding components. By way of a specific example, the force determining system 26 may be positioned in a downhole location along the drill string 30. In this example, the drill string 30 extends down into wellbore 22 from surface equipment 32 positioned above the wellbore 22 at a surface location 34. The drill string 30 may comprise a variety of components, such as drill pipe 36, a bottom hole assembly 38, a drill bit 40, and/or a variety of other components depending on the specifics of the drilling application. In some applications, the force determining system 26 may be mounted along the bottom hole assembly 38, although system 26 may be positioned at other suitable locations.

In an embodiment, force determining system 26 is in the form of a load cell 42 coupled with downhole component 28. Load cell 42 comprises a plurality of channels 44, e.g. capillaries, arranged in a desired pattern such that the channels 44 undergo changes in volume when component 28 is subjected to sufficient forces. A plurality of sensors 46 is positioned in cooperation with channels 44 to detect volumetric changes with respect to the channels 44 when component 28 is subjected to the sufficient forces, e.g. forces resulting from torque loads, bending loads, axial loads, temperature changes, or other sources creating forces in well string 30. In the example illustrated, an individual sensor 46 is associated with each channel 44 although different combinations of sensors 46 and channels 44 may be selected for some applications.

According to an embodiment, the channels 44 are enclosed and filled with a liquid, and sensors 46 are pressure sensors designed to detect changes in pressure of the liquid within corresponding channels 44. Changes in volume of individual channels 44 create changes in pressure acting on the corresponding pressure sensor 46. The channels 44 may comprise pairs or other numbers of channels arranged in specific, patterns for detection of a specific type of force, e.g. a torque load or a bending load. In some applications, groups of channels 44 are arranged to determine various different types of stresses acting on downhole component 28 and well string 30. The load cell 42 also may comprise a compensation system 48 which compensates for environmental effects, such as external temperatures and hydrostatic pressures acting on downhole component 28. The compensation system 48 may comprise additional channels 44 and sensors 46 arranged to provide data enabling compensation for the effects of such environmental factors.

The data from sensors 46, e.g. pressure data from pressure sensors, is output to a processing system 50. By way of example, processing system 50 may be a computer-based processing system having a suitable processor, such as a microprocessor. The data from sensors 46 is converted by processing system 50 into force data, e.g. stress values, which may be monitored and used in optimizing or otherwise adjusting the well application. In a drilling operation, for example, the pressure data from sensors 46 may be converted to force data affecting downhole component 28 and drill string 30, and this information may be used in optimizing or otherwise adjusting the drilling operation.

Figure 2:
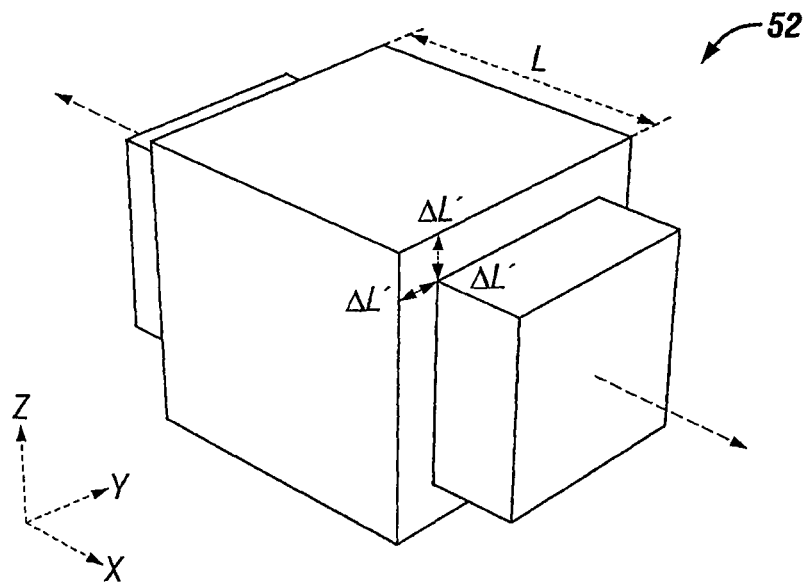
FIG. 2 is an illustration of a diagrammatic cube subjected to strains resulting from various force loading, according to an embodiment of the disclosure.

Referring generally to FIG. 2, an illustration of a diagrammatic cube 52 is provided to facilitate an understanding of the operation of load cell 42. With reference to cube 52, the basic Poisson's effect calculations explain the relationship between the stress applied and the deformation. Based on this relationship, the volume change may be determined. The calculations for a simple case may be described as follows: For cube 52 stretched with a length increase of $\Delta L$ in the main direction, and a length decrease of $\Delta L'$ in the perpendicular directions, the infinitesimal diagonal strains are given by:

$$v \approx \frac{\Delta L'}{\Delta L}$$

The relative change of volume $\Delta V/V$ due to the stretch of the material can be calculated. Using $V=L^3$ and $V+\Delta V=(L+\Delta L)(L-\Delta L')^2$:

$$\frac{\Delta V}{V} = \left(1 + \frac{\Delta L}{L}\right)\left(1 - \frac{\Delta L'}{L}\right)^2 - 1$$

Using the above derived relationship between $\Delta L$ and $\Delta L'$:

$$\frac{\Delta V}{V} = \left(1 + \frac{\Delta L}{L}\right)^{1-2v} - 1$$

and for very small values of $\Delta L$ and $\Delta L'$, the first-order approximation yields:

$$\frac{\Delta V}{V} \approx (1-2v)\frac{\Delta L}{L}$$

Then, with the Young's modulus a link may be made with respect to the stress and the force applied:

$$E \equiv \frac{\text{tensile stress}}{\text{tensile strain}} = \frac{\sigma}{\varepsilon} = \frac{F/A_0}{\Delta L/L_0} = \frac{FL_0}{A_0 \Delta L}$$

Using the previously calculated volume change:

$$\frac{\Delta V}{V} \approx (1-2v)\frac{F}{E \cdot L^2}$$

The force applied is then:

$$F \approx \frac{E \cdot L^2}{1-2v} \cdot \frac{\Delta V}{V}$$

In this relatively simple example, the volume change is linked to and corresponds with the force applied. The calculations utilize Poisson's ratio and lengths of the volume (length L and length L'). With respect to system 26, the forces experienced by load cell 42 cause changes in the volume of channels 44. The changes in volume cause corresponding changes in pressure which are measured by sensors 46. As a result, the pressure changes can be used as an indicator of the forces applied to the component 28 and thus to load cell 42.

In downhole applications, the force determining system 26 may be designed to both measure forces and to compensate for environmental factors. In a specific example, the force determining system 26 is used for measuring applied force on drill string 30. The downhole component 28 may be in the form of a solid "sub" having different patterns of channels 44, e.g. capillaries, formed in the sub. The channels 44 are constructed to undergo a greater volumetric change as a result of stress applied in a predetermined direction as compared to stress applied in a different direction.

Figure 3:
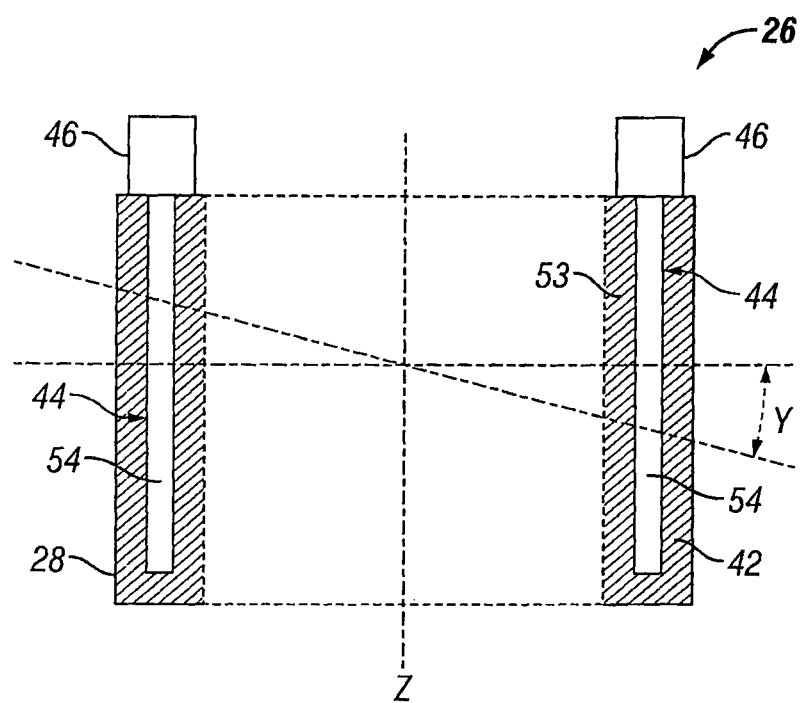
FIG. 3 is an example of a force detecting system that may be used with the well string illustrated in FIG. 1 and/or with a variety of other systems and components, according to an embodiment of the disclosure.

Referring generally to FIG. 3, an example of load cell 42 incorporating the force determining system 26 is illustrated. In this embodiment, a plurality of channels 44 is arranged in a body 53 in a specific pattern, e.g. a parallel pattern with a specific orientation, and the channels 44 are filled with a liquid 54. The body 53 may be coupled to or part of component 28. The liquid 54 is enclosed in each channel 44. Sensors 46, in the form of pressure sensors, are exposed to the pressure of the liquid in corresponding channels 44. For example, a pressure sensor 46 may be positioned at and enclose an open end of each channel 44, e.g. capillary, as illustrated in FIG. 3. The pressure exerted by the liquid in each channel 44 is related to the volume of the channel 44. The pressure detected by pressure sensors 46 is converted by processing system 50 to the stress/force acting on component/sub 28 as described above.

The construction of load cell 42 also enables placement of the sensors 46 in a protected area away from environmental influences, such as the fluids, temperatures, pressures, and corrosive elements of a downhole environment. Additionally, the measurement sensitivity of this type of load cell is less susceptible to environmental hydrostatic pressure. The load cell wall between the outside hydrostatic pressure and the channels 44, e.g. capillaries, limits the volume deformation due to this environmental pressure. Some capillary patterns can be selected to substantially or fully negate the effect of capillary volumetric changes due to the external hydrostatic pressure. The illustrated embodiment also provides a structure without moving parts in a form that enables a less complex and less fragile assembly. The structure provides a robust load cell in which measurement precision is linked to the selected capillary patterns, sensor sensibility, and repeatability rather than to sensor precision.

Referring again to FIG. 3, an example is provided in which two sensors 46 are pressure sensors positioned so as to act similarly to a strain gauge. When both sensors 46 measure a symmetric variation in volume, the symmetric variation in volume indicates force acting in the Z axis. When the sensors 46 measure opposite variation in volume, the opposite variation indicates flexion around the X axis. Combinations of state are possible, and as with a strain gauges, can be un-crosslinked by different measuring capillary patterns and/or different mean direction measurements. Many different types of forces and orientations of forces can be measured with the force determining system 26 by selecting appropriate capillary patterns. For example, torque forces and bending forces may be determined and monitored by selecting the appropriate capillary pattern.

For embodiments of load cell 42 utilizing force determining system 26, the load cell 42 may be calibrated and compensated for effects due to external factors, thus enhancing measurement precision. Direct calibration may be performed on the load cell 42 by placing the load cell under a known force, environment, temperature, and/or other force inducing influence and then a correlation may be made to compensate the measurement with reality. A variety of compensation methods may be employed and may be based on material characteristics of the load cell/device 42. If parameters like the geometries, Young's modulus, Poisson's ratio, and thermal expansion of the solid materials and liquid are known, then appropriate compensation may be made regarding the environmental factors and volume variation of the channels 44.

An example of compensation system 48 comprises a system in which pressure effects negate temperature effects. In this example, the compensation system 48 utilizes the same capillaries 44, same liquid 54, and same material for the body 53 into which capillaries 44 are formed. However, the wall thickness of the material surrounding the capillaries 44 is different between the force determining system 26 and the compensation system 48. In this example, the volume change due to pressure is higher in the capillary section having a thinner wall section, but thermal expansion remains the same. The difference may be used in compensating for temperature effects. In some embodiments, the appropriate compensation may be obtained by using the same capillaries 44 formed in two different materials. The two different materials may have the same thermal expansion coefficient and the same Poisson's ratio but a different Young's modulus. An example of two such different materials is tungsten alloy versus titanium alloy.

The compensation system 48 also may be designed so the temperature effects negate pressure effects. In this example, the load cell 42 utilizes force determining system 26 and compensation system 48 formed of two different materials but with the same types of capillaries 44 formed in the two different materials. The two different materials have different thermal expansion coefficients but the same Poisson's ratio and Young's modulus. An example of the two materials is ferritic stainless alloy versus austenitic stainless alloy. The volumetric change of the channels 44 due to the thermal expansion is higher in the higher thermal expansion alloy, but the deformation due to pressure is the same for both. These types of compensation systems enable the load cell 42 to be self-compensated with respect to temperature and/or hydrostatic pressure variation Depending on the application, the well system 20 may have a variety of configurations with other and/or additional components. For example, the load cell may have capillaries 44 arranged in a variety of patterns and combinations of patterns to determine different types of forces acting along or about different axes. Additionally, individual load cells or a plurality of load cells may be positioned in many types of well components and non-well components to provide a simple, protected device for determining and monitoring stress loads or other forces incurred by the device. Furthermore, the materials used to form the body of the load cell as well as the liquid utilized in the capillaries may vary between force determining and force compensating systems and according to parameters of a given application. The sensors also may be selected from a variety of pressure sensors or other volumetric change sensors to determine volumetric changes with respect to the corresponding channels, e.g. capillaries. In some applications, capillaries may be formed and sealed with respect to the sensors 46.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for measuring force, comprising:
a drill string disposed in a wellbore, the drill string having a downhole component and a load cell coupled with the downhole component, the load cell comprising:
a plurality of channels, each channel being filled with a liquid; and
a plurality of pressure sensors, each pressure sensor being associated with a corresponding channel of the plurality of channels, the pressure sensors measuring changes in pressure resulting from changes in volume in the plurality of channels when the downhole component is subjected to a sufficient load force.

2. The system as recited in claim 1, wherein the plurality of channels comprises capillaries oriented to detect stress on the downhole component in a predetermined direction.

3. The system as recited in claim 2, wherein the capillaries comprise a pair of parallel capillaries.

4. The system as recited in claim 1, further comprising an electronic processing system coupled to the plurality of pressure sensors to convert pressure change data to forces applied to the downhole component.

5. The system as recited in claim 1, wherein the plurality of pressure sensors is placed in a protected area on the downhole component to reduce exposure to environmental factors in the wellbore.

6. The system as recited in claim 1, wherein the load cell further comprises a compensation system which compensates for temperature and hydrostatic pressure.

7. The system as recited in claim 6, wherein the compensation system comprises additional channels filled with liquid.

8. The system as recited in claim 1, wherein the plurality of channels comprises capillaries arranged in a predetermined pattern to measure torque loads, bending loads, temperature induced loads, or axial loads.

9. A method for measuring force in a well component, comprising:
placing a plurality of capillaries in a downhole well component;
enclosing a liquid in the plurality of capillaries;
engaging a pressure sensor with the liquid in each capillary of the plurality of capillaries; and
using the pressure sensors to monitor the loading on the downhole well component by measuring pressure changes in the liquid due to the volumetric changes in the plurality of capillaries when the downhole well component is subjected to sufficient forces.

10. The method as recited in claim 9, wherein using comprises outputting data from the pressure sensors to a processing system.

11. The method as recited in claim 9, further comprising moving the downhole well component downhole into a wellbore.

12. The method as recited in claim 9, further comprising locating the downhole well component in a drill string.

13. The method as recited in claim 9, further comprising compensating the measurements obtained by the pressure sensors for external effects.

14. A system for measuring force, comprising:
a load cell having: channels extending into a component subjected to forces; and
sensors cooperating with the channels to detect changes in volume of the channels as an indication of forces acting on the component; and
a well string, the load cell being mounted to the well string.

15. The system as recited in claim 14, wherein each channel encloses a liquid and each sensor comprises a pressure sensor to measure pressure changes in the liquid which result from corresponding volume changes in a corresponding channel.

16. The system as recited in claim 15, further comprising a processing system coupled to each sensor to process pressure data and to use the pressure data in determining the forces acting on the component.

17. The system as recited in claim 14, wherein the component is a body of the load cell, the channels extending into the body.

18. The system as recited in claim 14, wherein the component comprises a downhole well component.

19. The system as recited in claim 14, further comprising a drill string, the load cell being mounted to the drill string.

* * * * *